United States Patent [19]
Englert et al.

[11] 3,837,900
[45] Sept. 24, 1974

[54] SEMI-PERMEABLE MEMBRANE

[75] Inventors: Robert D. Englert, Corona Del Mar; Lester P. Berriman, Irvine; John L. Rendall, Portola Valley, all of Calif.

[73] Assignee: Koratec, Inc., San Francisco, Calif.

[22] Filed: Jan. 22, 1973

[21] Appl. No.: 325,362

Related U.S. Application Data

[63] Continuation of Ser. No. 132,171, April 7, 1971, abandoned.

[52] U.S. Cl.... 117/93.1 DH, 117/145, 117/161 LN, 264/26, 264/48, 264/217, 210/506
[51] Int. Cl......... F26b 3/34, C08g 9/00, C08g 9/10
[58] Field of Search ..... 117/93.1 DH, 145, 161 LN; 264/217, 41, 48, 26, 347, 236; 210/506

[56] References Cited
UNITED STATES PATENTS

| | | | |
|---|---|---|---|
| 2,689,806 | 9/1954 | Dalton et al. | 117/93.1 DH |
| 3,428,584 | 2/1969 | Riley | 264/217 |

*Primary Examiner*—William D. Martin
*Assistant Examiner*—John H. Newsome
*Attorney, Agent, or Firm*—Lyon and Lyon

[57] ABSTRACT

A treated cellulosic reverse osmosis membrane having decreased compaction and better resistance to flux rate decrease with time as compared with an untreated membrane. An untreated membrane is contacted with cross-linking resins such as methylolated melamines and subjected to microwave radiation.

28 Claims, No Drawings

SEMI-PERMEABLE MEMBRANE

This application is a continuation of application Ser. No. 132,171, filed Apr. 7, 1971, now abandoned.

BACKGROUND OF THE INVENTION

The field of this invention is semi-permeable membranes useful for processes such as reverse osmosis. This process is of particular interest for the purification of water because of the ability of such membranes to permit the passage of pure water while preventing the passage of undesirable dissolved substances such as sodium chloride.

Various reverse osmosis membranes are known. one common type of membrane is cast from a solution of cellulose acetate as disclosed in Loeb et al., U.S. Pat. Nos. 3,133,132 and 3,133,137. Similar membranes are disclosed in Cannon U.S. Pat. No. 3,460,683. Membranes disclosed in Cannon are also based on cellulose acetate solutions which are partially dried and which must be maintained in a damp state. One surface of the cellulose acetate membrane as disclosed in Cannon is an active layer. The remaining thickness of the membrane is believed to exist as an open cell structure.

During the use of such membranes, a high pressure differential such as 1,500 p.s.i.g. is maintained across the membrane, and it is well-known that the flux rate (rate of passage of fluid through the membrane) decreases with time. This decrease is present even though distilled water is passed through the membrane and is believed to be caused at least in part by a compression or compaction of the membrane in use resulting from the pressure differential across the membrane. Thus, the membranes require frequent replacement in order to maintain a useful flux rate.

Various attempts have been made to improve cellulosic reverse osmosis membranes. In Riley U.S. Pat. No. 3,428,584 a freeze drying step is utilized to permit the storage of membranes in a dry state.

SUMMARY OF THE INVENTION

We have discovered a process for treating cellulosic-containing reverse osmosis membranes which greatly reduces the decrease in flux rate with time. In some tests no decrease in flux rate was observed. Briefly, in accordance with the invention, an untreated semi-permeable membrane is contacted with a chemical cross-linking agent and a chemical blocking agent. This contacted membrane is then subjected to curing conditions which will not result in substantial shrinking of the treated membrane. We have discovered that microwave curing can be utilized effectively to produce a membrane which is cross-linked without the undesired shrinkage. After curing, the membranes remain effective upon drying and thus do not need to be maintained in a damp state. In tests conducted on the cured membranes to determine their effectiveness in separating fresh water from salt water, it was discovered that the initial flux rate could be improved and that the reduction in flux rate with time could be substantially reduced or even eliminated. The salt rejection rates remain high and the membrane is also capable of effectively resisting fungus or other biological attack.

DESCRIPTION OF THE PREFERRED EMBODIMENTS

Any cellulose-containing semi-permeable membrane may be treated by the process of this invention as long as they are stable under the treatment conditions. At present, the most commonly used membrane is formed from cellulose diacetate. Examples of other membrane resins which may be treated by the process of this invention include cellulose acetate, cellulose acetate butyrate, cellulose butyrate, cellulose nitrate and ethyl cellulose. The presence of free hydroxyl groups is believed to be desirable for optimum performance, and thus other polyhydroxyl containing polymers may be used.

The treatment process performs several functions. One function is the holding open, blocking or wedging of the polymer molecules within a membrane to be treated. Another function is the cross-linking of the blocked or wedged membrane. This second function may be performed by contacting the blocked membrane with a cross-linking resin followed by the curing or reacting of that resin. The blocking function is believed to hold open the pores in the membrane when the membrane is subjected to curing conditions.

The blocking agents may be either reactive with the polymer molecules or non-reactive. Two commonly used non-reactive blocking agents are glycerol and ethylene glycol. These are believed to function merely by reason of molecular size which causes a physical block or wedge between the cellulose-containing molecular chains. The improvement in flux rate noted with the nonreactive blocking agents was far below that resulting from the use of reactive blocking agents.

Both mono-functional and di-functional reactive blocking agents were tried. Examples of useful mono-functional blocking agents are monomethylolated amides, monomethylolated ureas, cyclic ureas, and cyclic ethylene ureas reacted with one molecule of formaldehyde. We have found monomethylolethylene urea to be a particularly useful mono-functional blocking agent.

The di-functional blocking agents not only perform as chemical wedges, but also are believed to function as cross-linking agents. Their ability to perform a blocking function results from their molecular size and their ability to cross-link results from their di-functionality. Useful di-functional blocking agents include methylolated melamines, such as the methylolated melamine solution sold under the trademark Aerotex M-3.

The incorporation of wetting agents with the blocking agent has been found to help the penetration of the blocking agents and cross-linking agents into the membrane. It is also believed that the wetting agent, when used in conjunction with the blocking and crosslinking agents, may contribute to the prevention of shrinkage of the membrane. Wetting agents of the nonionic type perform satisfactorily such as that available from Rohm and Haas under the tradename "Triton X-100," which is an aromatic propylene oxide derivative.

Suitable cross-linking agents include noncyclic and cyclic urea type formaldehyde reactants such as dimethyol dihydroxy imidazolidone;

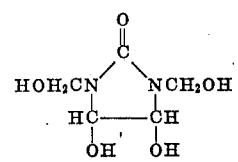

methylol ureas such as dimethylol ethylene urea (DMEU), dimethylol propylene urea; methylolated melamines or methylolated amino triazines; formaldehyde and glyoxal. Also, polyfunctional dialdehydes such as succinic dialdehyde or adipic dialdehyde will perform a cross-linking function. A solution of dimethylol dihydroxy imidazolidone sold under the tradename Permafresh 183 by Sun Chemical Co. was found to be particularly useful. Other cross-linking agents may also be used including alkylated derivatives of the above described agents. Further, other cross-linking systems such as methylolated carbamates and urons can be used and cross-linking agents in the vapor state such as formaldehyde may also be used.

The curing conditions applied to the uncured membrane which has been contacted with blocking agents and cross-linking agents is very important. Oven curing was found to cause shrinkage of the membrane which can destroy the flux rate. The curing must be carried out such that the membrane shrinkage is minimized. Even mild hot air oven curing (10 minutes at 250°F) caused a large decrease in flux rate when a reactive blocking agent was used.

The greatest success was achieved through the use of microwave curing. Microwave curing should be carried out utilizing techniques which will reduce shrinkage. It has been found that the insulating of an uncured membrane with a layer of material which permits the escape of vapor will result in a greatly improved membrane. This insulating may be achieved simply by covering the uncured membrane with an insulating material such as a fabric or paper. It is believed that microwave curing creates a more uniform blocking and cross-linking throughout the thickness of the film.

Another technique which will result in an improved flux rate is the carrying out of the microwave curing in a hot air oven. The temperature in the oven should be maintained near the curing temperature of the cross-linking system. It has been found that temperatures between 140° to about 500°F may be used. In this way the transfer of heat generated within the membrane by the microwaves is greatly reduced or eliminated. It has been found helpful to gently move the membrane while it is being subjected to microwave radiation. This movement tends to decrease any localized heating caused by an uneven application of microwaves. The use of a microwave stirrer is also useful for this same purpose, and, of course, such movement of the membrane can be achieved by use of a continuous process in which the film is moved continuously through the oven.

Microwave heating results from the exposure of the material to be cured to the emission of oscillator tubes such as magnetrons and klystrons. These tubes generate a high frequency microwave energy. The Federal Communications Commission has set aside the following frequencies for microwave processing:

| | | |
|---|---|---|
| 195 | megacycles/sec. | ± 25 mc./sec. |
| 2,450 | do. | ± 50 mc./sec. |
| 5,800 | do. | ± 75 mc./sec. |
| 17,925 | do. | ± 75 mc./sec. |
| 22,125 | do. | ± 125 mc./sec. |

Further information on microwave processing is available in a booklet entitled, "Microwave Heating in Freeze Drying, Electronic Ovens and Other Applications," David Copson, Avi Publishing Company, 1962.

Selection of catalyst is another important consideration which effects not only the curing conditions required but also was found to have an effect on concentration polarization. Generally, urea-type formaldehyde cross-linking reactants are effectively catalyzed by the use of acid catalyst. These acid catalysts may be either organic or inorganic acids or acid salts. In some instances, compounds such as sulfur dioxide may also be used. The catalyst chosen must not substantially degrade the membrane to be treated. Zinc nitrate has been found to be an effective catalyst which will not substantially degrade a cellulose diacetate semipermeable membrane. This zinc salt, however, resulted in a membrane which exhibited an excellent flux rate with distilled water but which was disappointing when used with salt water. That is, the flux rate for salt water was far below that which would have been predicted by the flux rate of distilled water. It was believed that this decreased flux rate with salt water was caused by increased polarization effects at the surface of the membrane which tends to concentrate the salt level at the surface of the membrane. This polarization effect was reduced by decreasing the amount of zinc nitrate in the final cured membrane. A decrease in zinc nitrate can be effected by using a shorter soaking time of the membrane in the catalyst solution. It was found that when the soaking time was reduced from 18 hours to 1 hour the concentration polarization effect was decreased. (Compare Example V with Example VII below.) Alternatively, the cured membrane may be soaked in distilled water to dissolve some of the remaining zinc nitrate. This was done in Example VIII below. This distilled water helped to remove the zinc nitrate and improved the flux rate in salt water. This improvement can be seen by a comparison of the results shown in Example V as compared with the results shown in Example VIII. It can be seen that the initial flux rate in salt water was increased from 9.9 to 16.2. The final flux rate was increased from 9.2 to 15.2.

Catalysts which did not exhibit the same concentration polarization as the zinc nitrate salt were also used. Hydrochloric acid was used to adjust the pH of the resin solution to 4 as shown in Examples I, II, III and IV. The hydrochloric acid can cause a precipitation if added initially to the resin system. It was found preferable to permit the membranes to soak in the resin solution before adding the hydrochloric acid. After the addition of the catalyst, an additional short soaking time such as 5 minutes was utilized and no precipitation problem was encountered.

The use of organic catalyst is shown in Example IX where citric acid was used.

The extent of microwave radiation is dependent upon both the resin and catalyst system as well as the type of microwave equipment used. Our work was carried out on a Raytheon Radar Range modified with infrared heating elements and a movable membrane carried set at the low setting. This setting is equivalent to a level of 875 watts. In general, it was found that the shorter the time of cure, the better the flux rate. Of course the radiation time must be sufficient to result in a substantial cross-linking of the membrane. A five minute microwave curing time was used in resins catalyzed with zinc nitrate. A 1 minute curing time for the hydrochloric acid system was found satisfactory. In general, the microwave frequency should be at least about 900 megacycles for a period of from 10 to 300 seconds. It is believed that the cross-linking provides more resiliency to the membrane thus causing it to more effectively resist compacting in use.

The following examples illustrate methods of carrying out the present invention, but it is to be understood that these examples are given primarily by way of illustration and not of limitation:

EXAMPLE I

A cellulose diacetate membrane with one surface hardened was soaked in the following solution for 18 hours: 36 grams of dimethylol dihydroxy imidazolidone sold under the tradename Permafresh 183

22½ grams methylolated melamine resin sold under the tradename Aerotex M-3

5 cc of 10% non-ionic type wetting agent sold under the tradename Triton X-100

137 cc distilled water

After 17 hours, the pH was adjusted to 4.0 with HCl and the membrane was soaked an additional five minutes. The HCl catalyst was added after the soaking step because it was found to cause a precipitation if added before this step. The soaked membrane was then removed from the bath and allowed to dry at room temperature. The dried membrane was then placed in the above described microwave oven set at the low power setting for one minute. The membrane was subjected to gentle motion during the microwave curing to help insure that all parts of the membrane received equal radiation.

The cured membrane was then placed in a high pressure membrane holder and sea water was placed over the membrane. The sea water was circulated through the membrane holder to decrease the effect of concentration polarization. Fresh water passing through the membrane was collected and the flux rate was determined by timing the collection. The final flux rate was measured after about three hours. The collected sample was analyzed for the salt content of the product water. The results were:

| Flux Rate Initial | (gpd/sq/ft.) Final | Initial Salt Conc. (ppm) | Salt Rejection (%) |
|---|---|---|---|
| 10.0 | 11.2 | 36,000 | 99.0 |

EXAMPLE II

The procedure of Example I was duplicated except that the microwave curing time was increased from one minute to two minutes. The results were:

| Flux Rate Initial | (gpd/sq.ft) Final | Initial Salt Conc. (ppm) | Salt Rejection (%) |
|---|---|---|---|
| 4.7 | 3.3 | 36.000 | 93.8 |

EXAMPLE III

The formula of Example I was used, but the pH was adjusted to 4 prior to soaking the untreated membrane. The soaking time was reduced to one hour after which the membrane was dried and cured using the procedure of Example I. The results were:

| Flux Rate Initial | (gpd/sq.ft.) Final | Initial Salt Conc. (ppm) | Salt Rejection (%) |
|---|---|---|---|
| 10.3 | 10.3 | 42,000 | 98.6 |

EXAMPLE IV

The procedures of Example III were duplicated except that the microwave curing time was increased from one minute to two minutes. The results were:

| Flux Rate Initial | (gpd/sq.ft.) Final | Initial Salt Conc. (ppm) | Salt Rejection (%) |
|---|---|---|---|
| 5.6 | 4.8 | 36,500 | 97.9 |

EXAMPLE V

A cellulose diacetate membrane with one surface hardened was soaked for 18 hours in the following solution:

40 grams of dimethylol dihydroxy imidazolidone sold under the tradename Permafresh 183
    30 grams of monomethylolethyleneurea
    10 grams of wetting agent sold under the tradename Triton X-100
    112 cc distilled water This system was catalyzed with 8 grams of zinc nitrate catalyst.

The soaked membrane was then removed from the bath and allowed to dry at room temperature. After drying, the membrane was placed in the microwave oven set at the "low" power setting for 5 minutes. During microwave curing the temperature on the membrane surface was maintained at approximately 160°F. The membrane was kept in gentle motion to help insure that all parts of the membrane received equal radiation.

The cured membrane was compared to an identical membrane which had not undergone this cross-linking treatment. The results using the test procedure described in Example I were:

| Membrane System | Flux Rate Initial | (gpd/sq.ft.) Final | Initial Salt Conc. (ppm) | Salt Rejection (%) |
|---|---|---|---|---|
| untreated | 10.0 | 8.8 | 36,000 | 98.8 |
| treated | 9.9 | 9.2 | 32,500 | 97.1 |

EXAMPLE VI

The flux rate for distilled water was determined for the treated membrane of Example V and for an untreated membrane. The membranes were placed in a high pressure membrane holder and distilled water at 1,500 p.s.i.g. was placed over the membrane. The results were:

| Membrane System | Initial Flux Rate | | Final Flux Rate | |
|---|---|---|---|---|
| untreated | 20.8 | gpd/sq. ft. | 16.8 | gpd/sq. ft. |
| treated | 45.0 | do. | 32.8 | do. |

EXAMPLE VII

The formula and procedures of Example V were duplicated except that the soak time was reduced from 18 hours to 1 hour. The cured fabrics were tested in distilled water and circulated salt water with the following results:

| Flux Rate (gpd/sq. ft.) | | | | Salt Conc. (ppm) | Salt Rejection (%) |
|---|---|---|---|---|---|
| Distilled Water | | Salt Water | | | |
| Initial | Final | Initial | Final | | |
| 28.2 | 26.7 | 15.0 | 12.8 | 37,500 | 97.3 |

EXAMPLE VIII

In order to determine the effect of the $Zn(NO_3)_2$ catalyst, the cured membrane of Example V was washed with distilled water prior to testing. The results were:

| Flux Rate (gpd/sq. ft.) | | | | Salt Conc. (ppm) | Salt Rejection (%) |
|---|---|---|---|---|---|
| Distilled Water | | Salt Water | | | |
| Initial | Final | Initial | Final | | |
| 45.0 | 32.8 | 16.2 | 15.2 | 34,000 | 94.9 |

EXAMPLE IX

The formula and procedure of Example V were followed except that 2 grams of citric acid were substituted for the zinc nitrate. The results were:

| Flux Rate (gpd/sq. ft.) | | | | Salt Conc. (ppm) | Salt Rejection (%) |
|---|---|---|---|---|---|
| Distilled Water | | Salt Water | | | |
| Initial | Final | Initial | Final | | |
| 25.4 | 23.3 | 13.5 | 11.0 | 39,500 | 95.4 |

Improvement in initial flux rate for synthetic sea water (3.5% sodium chloride in distilled water) resulting from this membrane treatment is shown to be as high as 62 % (an increase from 10.0 shown in Example V to 16.2 in Example VIII). By the same token, the final flux rate increased as much as 73% (from 8.8 shown in Example V to 15.2 shown in Example VIII), and in several examples was higher than the initial flux rate which, of course, shows an increase in the flux rate with time rather than the expected decrease.

A negative compaction effect was noticed in the membrane shown in Example I where the flux rate for synthetic sea water increased from 10.0 gpd/sq. ft. to 11.2 gpd/sq. ft. after three hours. The membrane of Example I was cured for one minute and it is believed that the combination of a di-functional blocking agent together with a short cure time is particularly useful. In general, the shorter the time of cure the better the flux rate.

It shall also be noted that if a gaseous crosslinking agent and/or catalyst is used, they may be brought into contact with the membrane either prior to or during curing by passing the vapor through the curing oven.

Although the quantities of the ingredients in the treatment solution may be varied widely, the blocking agent and cross-linking agent each typically will comprise about 0.5 to about 10.0 percent by weight based on the total weight of solids in the solution. The amount of the catalyst ordinarily will be from about 2 to about 4 weight percent based on the weight of total solids, but this may vary depending upon the particular catalyst used. In any event, the quantity of catalyst should be sufficient to retain the pH of the solution within the range of about 3.8 to about 4.2. The wetting agent will usually be used in an amount of from 0.2 to about 1.0 weight percent based on the weight of total solids in the treatment solution.

The preferred mode of application of the treatment medium is to soak the membrane in the solution. Although the contact time may be varied, good results are achieved when the membrane is soaked for from about 5 minutes to 1 hour, when the treatment medium is at room temperature, or even longer, as for example 18 hours as shown by the foregoing examples. In general, of course, the time necessary for adequate soaking decreases with increasing temperature of the treatment medium.

The above-described embodiments are to be considered in all respects as illustrative and not restrictive, the scope of the invention being indicated by the appended claims rather than by the foregoing description. All changes which come within the meaning and range of equivalency of the claims therefore are intended to be embraced therein.

We claim:

1. A process for treating a cellulosic semi-permeable membrane comprising
   combining said membrane with a cross-linking agent, a catalyst and a chemical blocking agent; and
   subjecting the resulting combined membrane to microwave radiation.

2. The process of claim 1, wherein the combined membrane is insulated to prevent loss of heat generated within said membrane during curing while permitting vapor to escape from said membrane.

3. The process of claim 1, wherein the combined membrane is held at a temperature on the order of the curing temperature of the cross-linking agent during a time when the combined membrane is subjected to microwave radiation.

4. The process of claim 1, wherein the combined membrane is continually moved while the microwave radiation is applied to the membrane.

5. The method of claim 3, wherein the temperature is held between about 140° to about 500°F.

6. The process of claim 1, wherein the cross-linking agent is a urea-type formaldehyde reactant.

7. The process of claim 1, wherein the chemical blocking agent is a monomethylolated amide.

8. The process of claim 1 in which said blocking agent is chemically reactive with said cellulosic membrane and is selected from the group consisting of monomethylolated amides, monomethylolated ureas, cyclic ureas and methylolated melamines.

9. The process of claim 8 in which the treatment medium comprises about 0.5 to about 10.0 weight percent, based on the total weight of solids in the treatment medium, of said chemical blocking agent.

10. The process of claim 6 in which said crosslinking agent comprises about 0.5 to about 10.0 weight percent of the treatment medium, based on the total weight of solids in such medium.

11. The process of claim 9 in which the crosslinking agent is a urea-type formaldehyde reactant and comprises about 0.5 to about 10.0 weight percent of the treatment medium, based on the total weight of solids in such medium.

12. The process of claim 11 in which the semipermeable membrane is combined with said crosslinking agent, catalyst and chemical blocking agent by impregnation with a solution of such components having a pH of from about 3.8 to about 4.2.

13. A process for decreasing the compaction of cellulosic semi-permeable membranes comprising
combining an untreated membrane with a urea-type formaldehyde cross-linking agent, a catalyst and a chemical blocking agent selected from the group consisting of monomethylolated amides, monomethylolated ureas and cyclic ureas;
placing the combined membrane in an environment which prevents any substantial loss of heat generated within said membrane which at the same time permits the escape of water vapor from the contacted membrane; and
subjecting the resulting combined membrane to microwave radiation sufficient to result in a substantial reaction between the cross-linking agent and the cellulosic membrane.

14. The process of claim 13, wherein said environment is an oven heated from about 140° to about 500°F.

15. The process of claim 14 wherein said environment is a heat insulator placed over said membrane which insulator permits the escape of water vapor from said membrane.

16. A process for reducing flux rate loss in a cellulosic semi-permeable membrane comprising blocking the polymer molecules of said membrane with a chemical blocking agent to prevent a substantial coming together of said molecules during curing, contacting said membrane with a resin system containing a crosslinking agent capable of reacting with cellulose, and subjecting the resulting contacted membrane to microwave energy at a frequency of at least about 900 megacycles per second over an interval of from about ten to about 300 seconds.

17. The process of claim 16 wherein the cross-linking agent is a urea-type formaldehyde reactant.

18. The process of claim 16 wherein the chemical blocking agent is a monomethylolated amide.

19. The process of claim 16 wherein the chemical blocking agent is metholated melamine.

20. The process of claim 17 wherein said crosslinking system contains an acid catalyst.

21. The process of claim 20 wherein said acid catalyst is added to said contacted membrane by soaking said contacted membrane in a solution containing said catalyst.

22. The process of claim 21 wherein said acid catalyst is zinc nitrate.

23. The process of claim 20 wherein said acid catalyst is hydrochloric acid.

24. The process of claim 20 wherein said acid catalyst is an organic catalyst.

25. The process of claim 24, wherein said acid catalyst is citric acid.

26. A cellulosic semi-permeable membrane of improved compaction resistance produced by the method of claim 1.

27. A process for decreasing compaction and reducing flux rate loss in cellulosic semi-permeable membranes comprising impregnating a cellulosic membrane with a resin system containing a chemical blocking agent and a crosslinking agent capable of reacting with cellulose, and thereafter subjecting the impregnated membrane to microwave radiation.

28. The process of claim 27 in which the treatment medium is at a pH of from about 3.8 to about 4.2 and comprises from about 0.5 to about 10.0 weight per cent of said chemical blocking agent and about 0.5 to about 10.0 weight per cent of said crosslinking agent, based on the total weight of solids in the treatment medium.

* * * * *